United States Patent [19]
Arai et al.

[11] Patent Number: 5,381,282
[45] Date of Patent: Jan. 10, 1995

[54] INTER-SAMPLE SWITCHING OF SERVO CONTROL IN DIRECT ACCESS STORAGE DEVICES

[75] Inventors: Koichi Arai, Fujisawa, Japan; Hal H. Ottesen, Rochester, Minn.; Arun Sharma, New Rochelle; Muthuthamby Sri-Jayantha, Ossining, both of N.Y.; Michael C. Stich, Rochester, Minn.

[73] Assignee: International Business Machines Corporation, Armonk, N.Y.

[21] Appl. No.: 779,438

[22] Filed: Oct. 18, 1991

[51] Int. Cl.6 .............................................. G11B 5/596
[52] U.S. Cl. ................................ 360/78.09; 360/78.06; 360/78.14; 360/77.04
[58] Field of Search ............... 360/78.07, 78.06, 78.04, 360/78.05, 78.09, 78.12, 77.04, 77.08, 78.14; 369/44.28, 44.29

[56] References Cited

U.S. PATENT DOCUMENTS

| | | | |
|---|---|---|---|
| 4,030,132 | 6/1977 | Iftikar et al. | 360/78.06 |
| 4,486,797 | 12/1984 | Workman | 318/561 |
| 4,488,189 | 12/1984 | Axmear et al. | 360/78.06 |
| 4,544,968 | 10/1985 | Anderson et al. | 360/78.06 |
| 4,679,103 | 7/1987 | Workman | 360/78.07 |
| 4,695,780 | 9/1987 | Kurakake et al. | 318/561 |
| 4,697,127 | 9/1987 | Stich et al. | 318/561 |
| 4,792,870 | 12/1988 | Pinson | 360/78.14 |
| 4,827,200 | 5/1989 | Ogura et al. | 360/78.06 |
| 4,894,599 | 1/1990 | Ottesen et al. | 318/636 |
| 4,907,109 | 3/1990 | Senio | 360/78.07 |
| 5,164,931 | 11/1992 | Yamaguchi et al. | 360/78.06 |

OTHER PUBLICATIONS

H. M. Ottesen, "Apparatus for Detecting and Correcting Excessive Vibration in a Disk File", IBM Technical Disclosure Bulleting, vol. 30, No. 6, Nov. 1987.

*Primary Examiner*—Aristotelis Psitos
*Assistant Examiner*—Muhammad Edun
*Attorney, Agent, or Firm*—David Aker; Ronald L. Drumheller

[57] ABSTRACT

A direct access storage device and a method of operation thereof where the output of the circuit which controls energy to the position actuator for the head may be changed at times between receipt of sequential position error signals from the medium. Instead of waiting for the next position error signal, a computation is done based on at least the current position and the desired position of the head as to when the head velocity will be equal to a desired velocity. The optimum time to switch is estimated, the energy required to achieve a predetermined velocity and a predetermined offset with respect to the desired position are computed, and operation is conducted accordingly. The amount of energy may again be changed at a time subsequent to the estimated time. The predetermined velocity and the predetermined offset may be zero or may have values other than zero in accordance with the requirements of the track following controller.

28 Claims, 11 Drawing Sheets

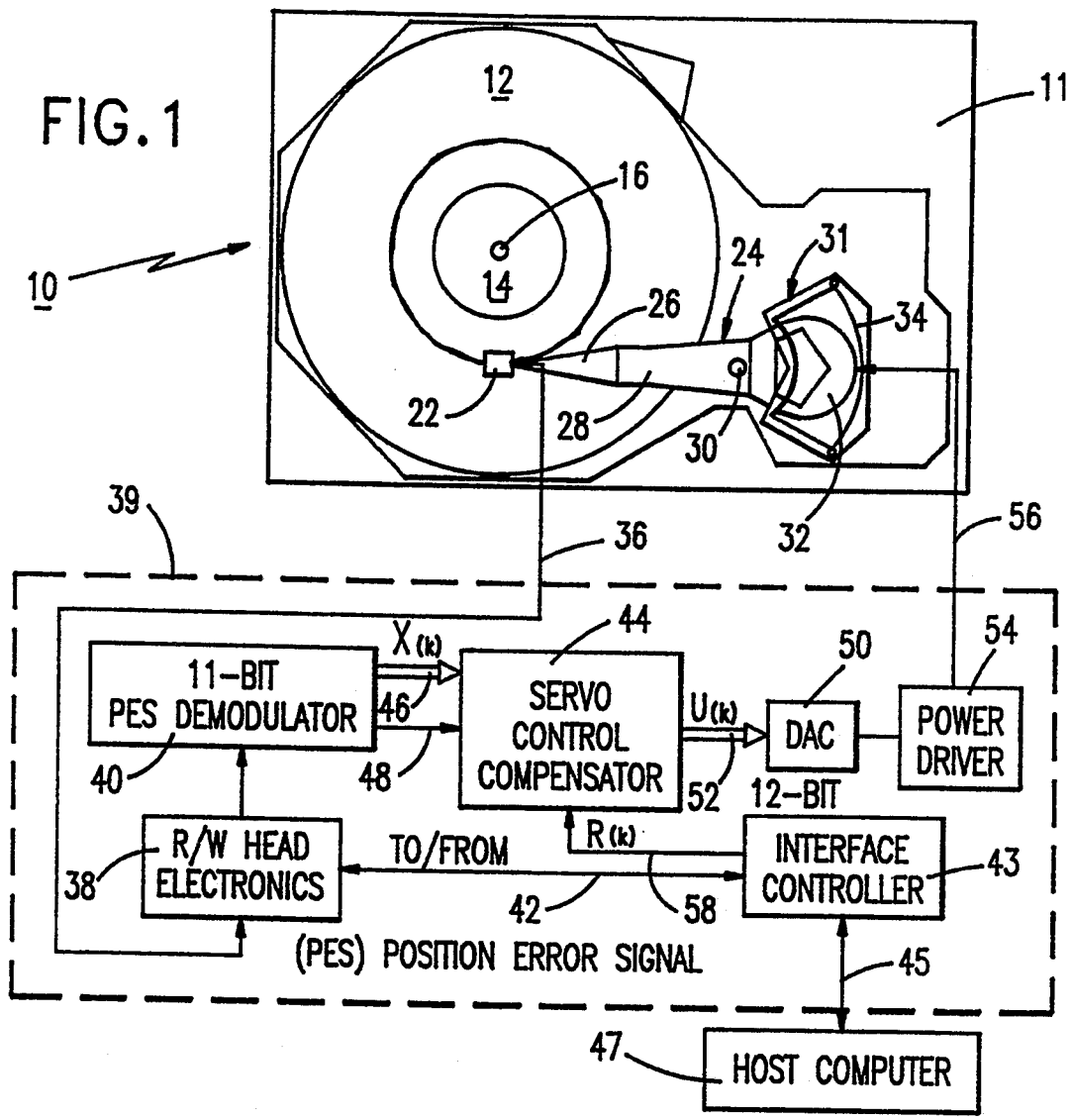
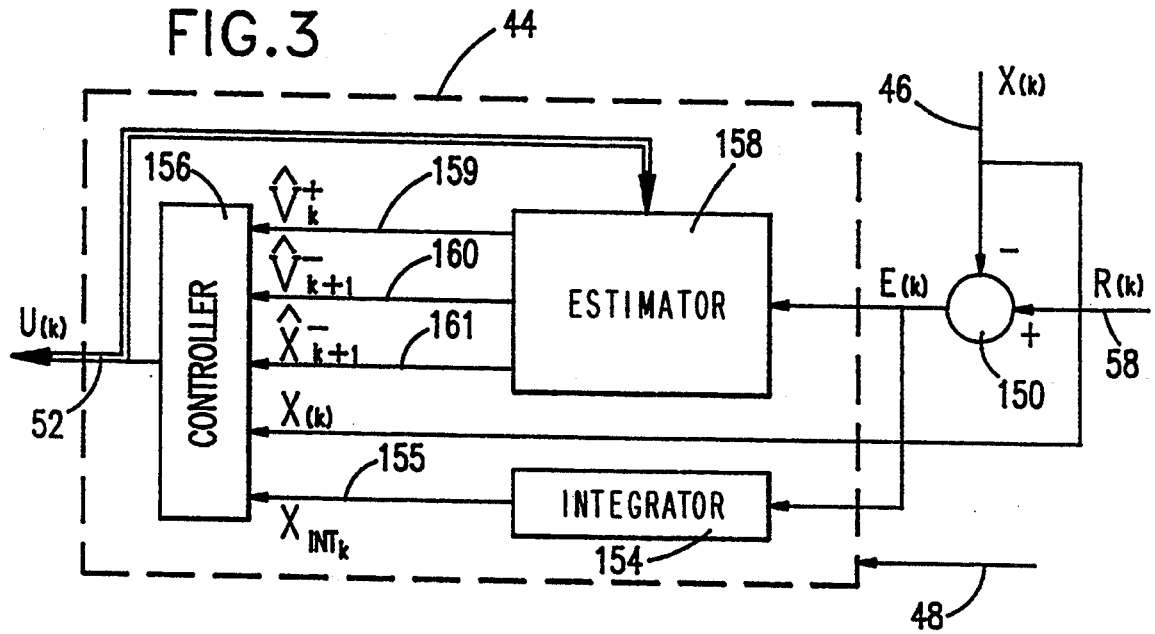

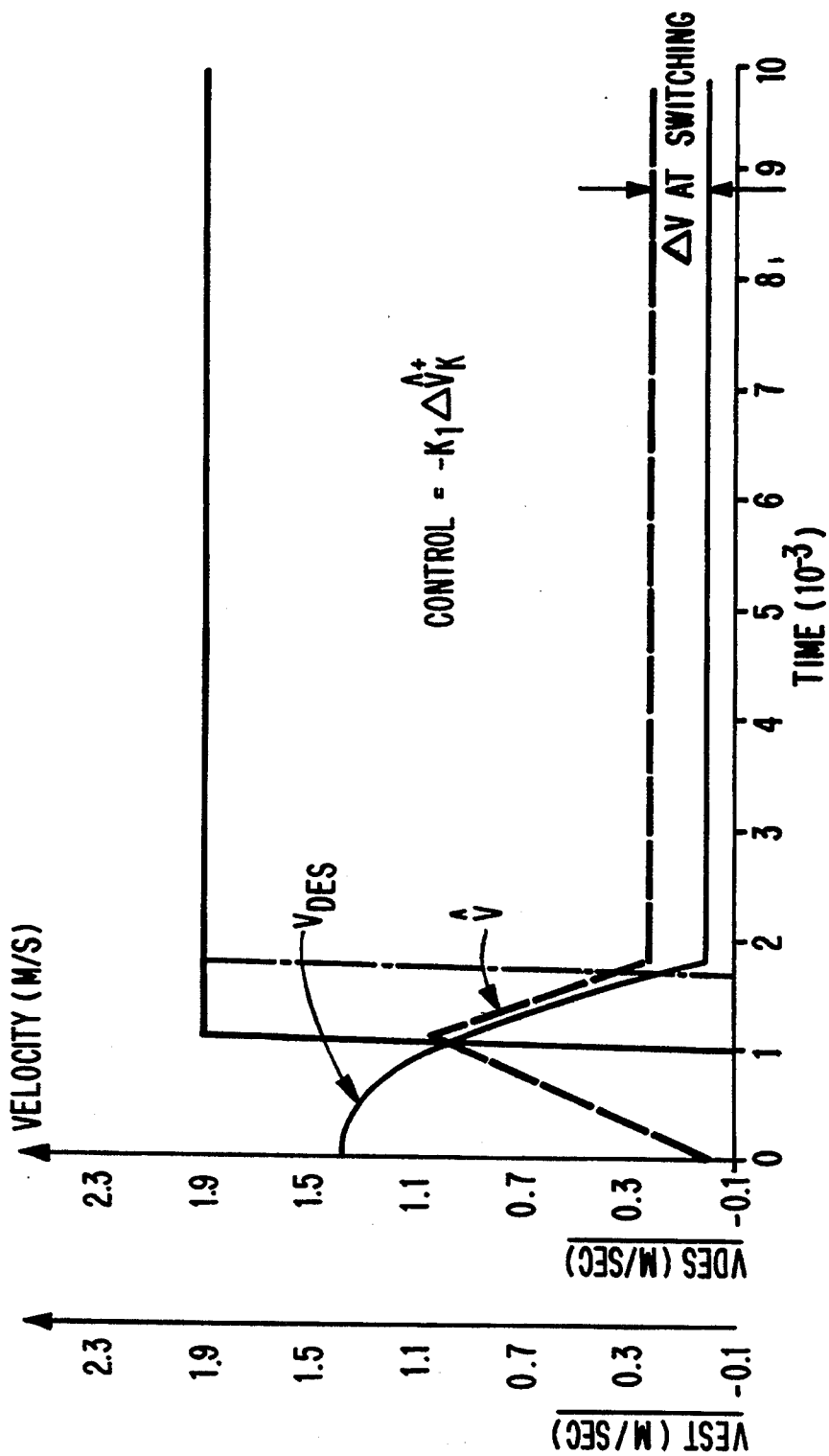

INTER-SAMPLE SWITCHING OF SERVO CONTROL IN DIRECT ACCESS STORAGE DEVICES

FIELD OF THE INVENTION

This invention relates to direct access storage devices (DASD's). More particularly, it relates to such devices having servo system operated positioning actuators, such as, for example, magnetic disk drives.

BACKGROUND ART

Recent technological developments in direct access storage devices, and in particular in magnetic storage devices have dramatically increased storage density. As a result, new storage devices having disks of smaller diameter can hold much more information.

As is well known in the art, the magnetic disk containing the information has circular tracks. One or more disks form a stack which is rotated by a motor. A read/write head is disposed in close facing relationship to a surface of the disk, so that digital information may be stored on or read from the tracks. Generally the surface of the disk is divided into sectors. Each track has, for each sector, a region which is used to store information which identifies the particular track and sector. The detection of this information by the read/write head and subsequent processing by read/write electronics and a decoder produces position error signals which are interlaced in a stream of data read from the disk. This is the case for a disk file having sector servo architecture. In a dedicated servo, all position information is stored on a single disk surface, while all other disk surfaces have only data information. Sometimes, the data surfaces may have a few tracks of position information, usually at the edges of the annular data band, to handle offsets between the servo head and any of the data heads.

The position error signal (PES) is used in a servo control loop to control the position of an actuator, on which the read/write head is mounted. With suitable inputs to the servo control system, the position actuator be directed to a particular track and, once having found that track, will be directed to follow the track.

As overall disk size is decreased, the position error signal occupies an increasing percentage of the total area of the disk, thus decreasing the effective data storage density. Further, as disk size decreases, it is theoretically possible to obtain faster access times to a desired track and sector. However, if the number of regions containing position error signal information is decreased to maintain the highest possible storage density, the advantage of faster access times is lost. The loss of faster access times is a direct result of the fact that prior art systems must wait until new position error signal information is obtained, in order to recompute the amount of energy that must be supplied to the actuator that positions the read/write head. Since the frequency of occurrence of the position error signal information is not high, and computation of the amount of energy required to meet a particular velocity profile in seeking a track is performed only at the receipt of a new position error signal, prior art systems are not as fast and accurate, in seeking and following a particular track, as would seem to be possible in theory. Settle-out times (that is, the time for the head to settle within a certain error band of a target track) are limited by waiting for position error signal information, rather than by mechanical constraints, thus limiting the speed with which data can be accessed.

SUMMARY OF THE INVENTION

It is an object of the present invention to provide direct access storage devices with rapid settle-out time.

It is another object of the present invention to provide direct access storage devices wherein settle-out performance is not limited by the sampling rate at which position error signal information is received.

It is yet another object of the invention to provide direct access storage devices wherein storage density is not limited by the need to provide very large numbers of sectors carrying position error signal information.

It is still another object of the invention to provide a direct access storage device wherein performance is enhanced by utilizing the relatively high speed capabilities of the on-board digital-to-analog converter in the position control loop of the servo system.

In accordance with the invention, a direct access storage apparatus including a servo loop for positioning a head for interaction with a storage medium having position data recorded in selected regions thereon comprises: an actuator means for positioning the head so that the head periodically acquires position data from the medium; decoding means for decoding the position data acquired by the head from the medium and for providing decoded position data; a driver circuit for supplying energy to said actuator means; a controller for providing an output for controlling said driver circuit to supply said energy based on inputs representative of at least the position of said head as defined by said decoded position data received from said decoding means, and data representative of a position to which said head is to be moved; and output control means for changing magnitude of the output of said controller circuit at times between the times of receipt of position data from the medium.

In accordance with the invention, the output control means comprises estimating means for estimating a velocity of the head at the time of receipt of position data; interpolation means for calculating an estimated time when the actual velocity of the head will match a desired velocity; and switching means for causing the magnitude of said output to change at the estimated time calculated by said interpolation means.

The invention also includes a method for operating a direct access storage device including a servo system for controlling position of an actuator, the actuator having coupled thereto a head which interacts with a storage medium, the storage medium having position data stored in selected regions thereon, comprising the steps of determining the position of the head from the position data; acquiring information indicative of a position to which the head is to be moved by the actuator means; supplying energy to the actuator based on the present position and the position to which the head is to be moved, and changing the amount of energy supplied to the head at times between receipt of the position data by the head.

BRIEF DESCRIPTION OF THE DRAWINGS

FIG. 1 is a block diagram of a sector servo disk drive system according to the present invention;

FIG. 3 is a block diagram of a digital servo control compensator in accordance with the invention.

FIG. 6A and FIG. 6B illustrate, respectively, the head velocity and the position error signal for a conventional disk drive servo using a proportional velocity servo;

DESCRIPTION OF THE PREFERRED EMBODIMENT

Figure 2A:
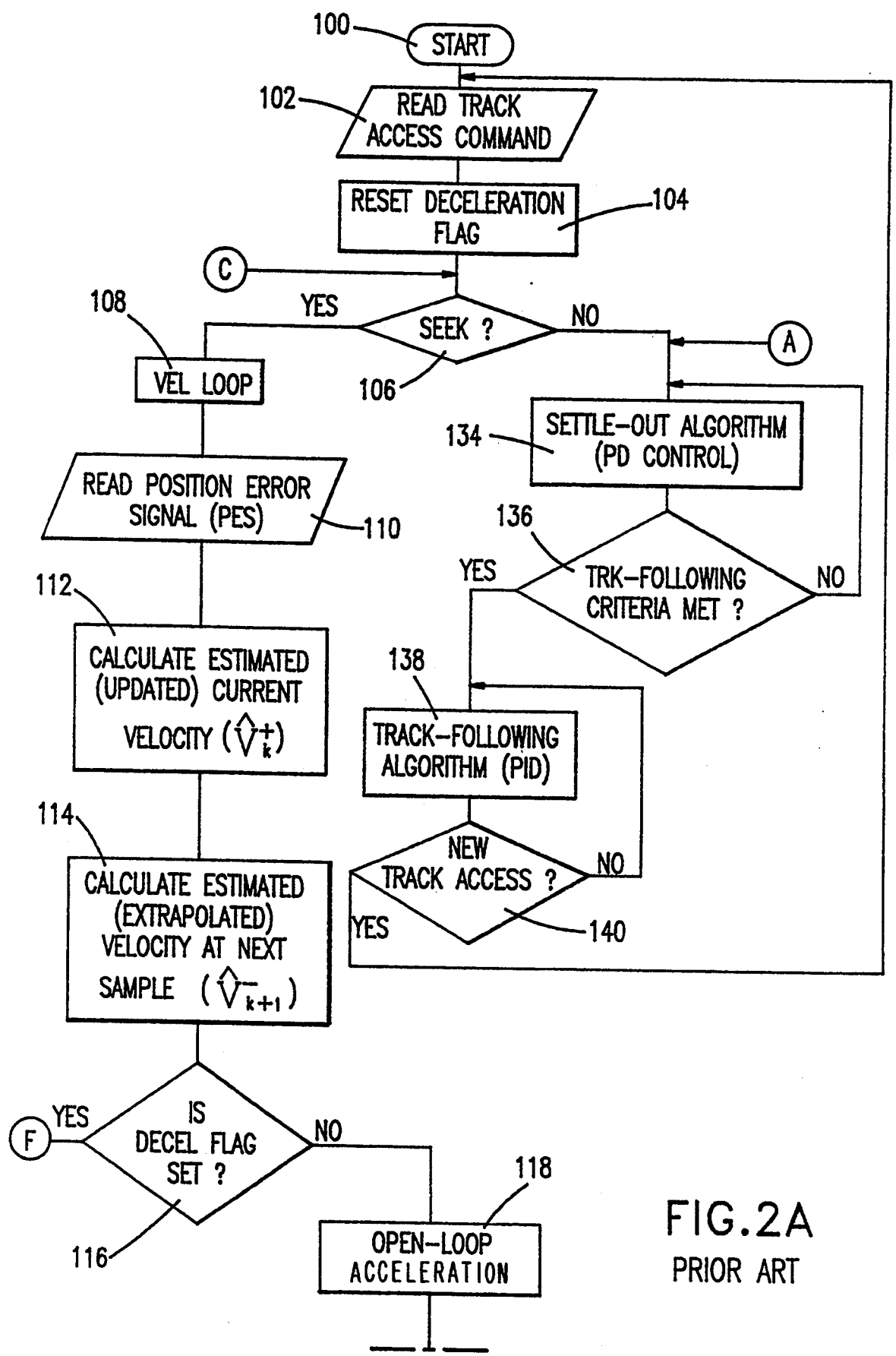
FIG. 2A and FIG. 2B are successive parts of a flowchart of the operation of the digital signal processor of prior art position control servo systems.

While the present invention is described with respect to a magnetic disk drive, it will be understood by those in the art that the present invention has application to any direct access storage device (DASD), including a servo positioning system for operation with a medium having position information stored thereon, such as, for example devices using optical storage media.

Referring to FIG. 1, a typical, small, low-end sector servo DASD 10 and a block diagram of the electronic modules for providing control of DASD 10 are illustrated. It is understood that electronic modules associated with DASD 10 are typically mounted on a circuit board (not shown), located within the housing 11 of DASD 10.

At least one disk 12 having sector servo information (position error signal information) written thereon is mounted in housing 11. Disk 12 is carried by a spindle 14 which rotates on a bearing 16. A motor (not shown) rotates disk 12.

A read/write head 22 is supported in close facing relationship to the surface of disk 12 by an actuator 24 including a support arm 26 mounted to a support member 28 which pivots about a bearing 30. A voice coil motor 31 (VCM) having a voice coil 32 extends from support member 28 and is disposed in a magnetic field produced by a permanent magnet structure 34. Current supplied to voice coil 32 causes it to change its position in the magnetic field, thus pivoting support member 28 about bearing 30 and changing the radial position of read/write head 22 with respect to disk 12.

Data received by read/write head 22 from disk 12, including position error signal information, and other data stored on disk 12 is carried by line 36 to read/write head electronics 38 within a servo control system 39. The position error signal information is separated from the stream of stored data and supplied to a position error signal demodulator 40.

The stream of data, other than the position error signal information, is supplied by a line 42 to an interface controller 43, which in turn is connected by a bidirectional bus 45 to a host computer 47 which utilizes DASD 10 for data storage. Thus, it will be understood that line 42 is also bidirectional so that data supplied from the host computer 47 via bus 45 and interface controller 43 may be provided to the read/write head 22 to be stored on disk 12 (line 36 is also bidirectional for this purpose). The interface controller 43 may be any of several controllers that are well known in the art, such as a SCSI interface.

Demodulated position error signal information X(k) is supplied by demodulator 40 to a digital signal processor or servo control compensator 44 by a bus 46. Demodulator 40 also supplies an interrupt signal to digital signal processor 44 on an interrupt line 48, as initiate operation of processor 44 at appropriate times.

Digital signal processor 44 supplies a digital control signal to a high speed switching digital-to-analog converter (DAC) 50 via a bus 52. DAC 50 supplies an analog signal to an analog power driver 54 which in turn supplies current to voice coil 32 along a line 56.

Read/write head 22 is directed to a particular track by reference track information R(k) received on a reference track input bus 58 from interface controller 43 based on commands from host computer 47, as is well known in the art.

Referring to FIG. 2A, the operation of a digital signal processor 44, according to the prior art, is illustrated. The system is initialized at start step 100. At step 102, data on bus 58 is read as the track access command. At step 104, a deceleration flag is reset to the acceleration position. This is done so that the system is no longer in the deceleration mode, as was required in the prior track access and following operations. At step 106, a determination is made as to whether the track access command received from host computer 47 (which causes interface controller 43 to provide appropriate reference track information) requires the head to be moved to a new track. Assuming that this is the case, the system enters the "seek" mode, and branching to a velocity loop initialization at step 108, occurs. At step 110, the position error signal is read by the servo control compensator 44. Based on this information, an estimate of the current velocity, $\hat{V}_{k+}$ is made at step 112. Further, the estimated velocity at the next occurrence of the position error signal, $\hat{V}_{k+1}$ is performed at step 114. The manner in which these values are obtained is well known in the art and may be found in Digital Control of Dynamic Systems, by Eugene Franklin and J. David Powell, Addison Wesley (1980). In this regard reference is also made to U.S. Pat. No. 4,697,127 to Stich et al.

A determination is made at step 116 as to the state of the acceleration flag. Since the flag was reset at step 104, branching to step 118 occurs and open loop acceleration is commenced. A determination is made at step 120 as to whether the desired velocity $V_{DES}$ (in accordance with an acceleration profile) minus the updated estimated velocity at the last sampling time $\hat{V}_{k+}$ is less than or equal to some fixed tolerance or error $\Delta V$ in the velocity of head 22. Assuming that this difference is not less than the tolerance value, at step 122, maximum acceleration current is provided by power driver 54 in response to an output from digital signal processor 44.

The program then loops back to step 106 to again determine whether it is still appropriate for the system to be in the "seek" mode. Assuming that it is, branching occurs back to the velocity loop (step 108), and subsequent steps 110 to 120 are repeated. If at step 120 it is determined that the desired velocity minus the estimated velocity at sampling time k is less than the tolerance on the velocity, branching to step 124 occurs, where the deceleration flag is set. Step 127 shown in FIG. 2b is then executed.

Figure 2B:
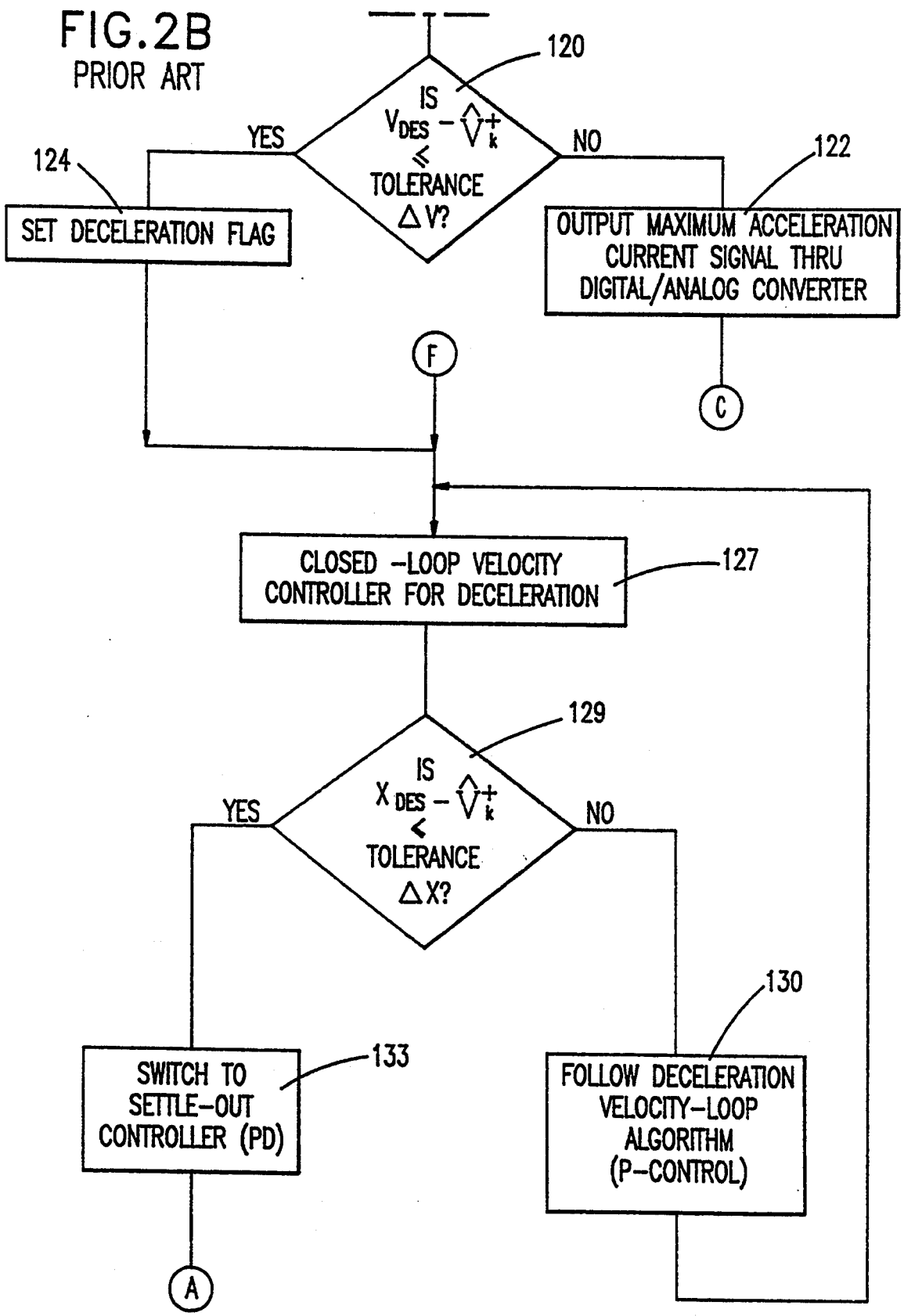

Referring to FIG. 2B, at step 127, the system enters a closed loop velocity control algorithm for deceleration of the actuator system. At step 129 a determination is made, as to whether the desired position $X_{DES}$ minus the estimated position at the last sampling time $\hat{X}_k^+$ is less than or equal to a predetermined tolerance in the position $\Delta X$. Assuming that it is not, branching to step 130 occurs, where a proportional integral (PI) or proportional (P) deceleration velocity-loop algorithm of a type well known in the art is followed. The program then loops back to step 127, and steps 127, 129 and 130 are repeatedly executed until at step 129 a determination is made that the difference between the desired position $X_{DES}$ and the estimated position at the last sample of the position error signal $\hat{X}_k^+$ is less than the predetermined tolerance in position $\Delta X$. Assuming that this is the case, branching to step 133 occurs, and the system switches to the track following mode using proportional derivative (PD) control. Branching to step 134 (FIG. 2A) occurs, and a track following algorithm is implemented. At step 136 a determination is made as to whether or not settle-out has occurred. Assuming that it has not, the track following loop algorithm continues to be executed at step 134. When settle-out has occurred, the system remains in the track following mode using a proportional integral derivative algorithm (PID), at step 138 until a new track access command is received from the host computer at step 140. When this occurs, the program returns to step 102.

FIG. 3 is a block diagram of servo control compensator 44 of FIG. 1 configured in accordance with the invention. While the functional blocks therein are shown as hardware blocks, it will be understood that in appropriate applications, these blocks may be implemented by software. The reference track information R(k) (which may be either internally generated or, as in the described embodiment, is received from bus 58) and the demodulated position error signal information X(k) from bus 46 are subtracted at a subtraction node 150 to produce a difference signal E(k) on lead 151. This signal is supplied to an integrator 154 to produce integrated position signal $X_{INTk}$ on lead 155, as is well known in the art. This signal is in turn supplied to a microprocessor or controller 156. Difference signal E(k) is supplied to an estimator 158 which produces estimated signal outputs. Conventionally, a velocity estimate $\hat{V}_k^+$ at sampling time k, based on the last, updated state is generated by estimator 158. This is supplied to controller 156 on lead 159.

Estimator 158 also calculates, at time k, an extrapolated value of velocity $\hat{V}_{\overline{k}+1}$ on lead 160 corresponding to the k+1 sampling time. At time k, it also calculates an extrapolated position $X_{\overline{k}+1}$ on lead 161 of the head 22 corresponding to the k+1 sampling time. These values are supplied to controller 156. The value of position X(k) on lead 46 (or an updated value thereof) is also supplied to controller 156.

Controller 156 produces a digital velocity control signal U(k) on bus 52 as an input to DAC 50, as described above. The output U(k) of controller 156 is also supplied as an input to estimator 158 to assist in performing estimates. The manner in which these quantities are determined by estimator 158 is explained in some detail in the above mentioned book by Franklin and Powell and in U.S. Pat. No. 4,697,127 mentioned above, which is incorporated herein by reference.

Figure 4A:
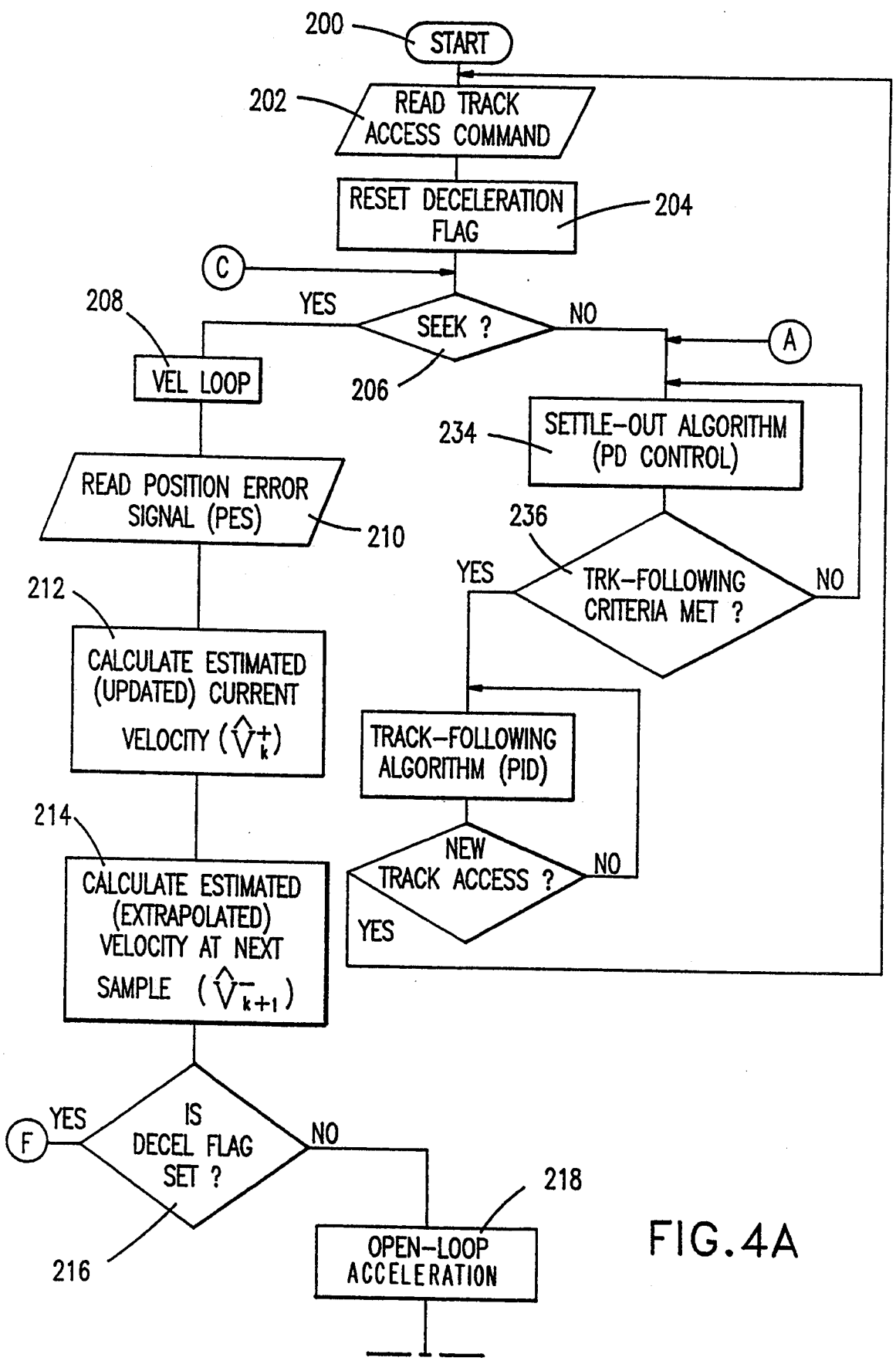
FIG. 4A and FIG. 4B are successive parts of a flow chart describing the operation of the digital servo control compensator of FIG. 3.
Figure 4B:
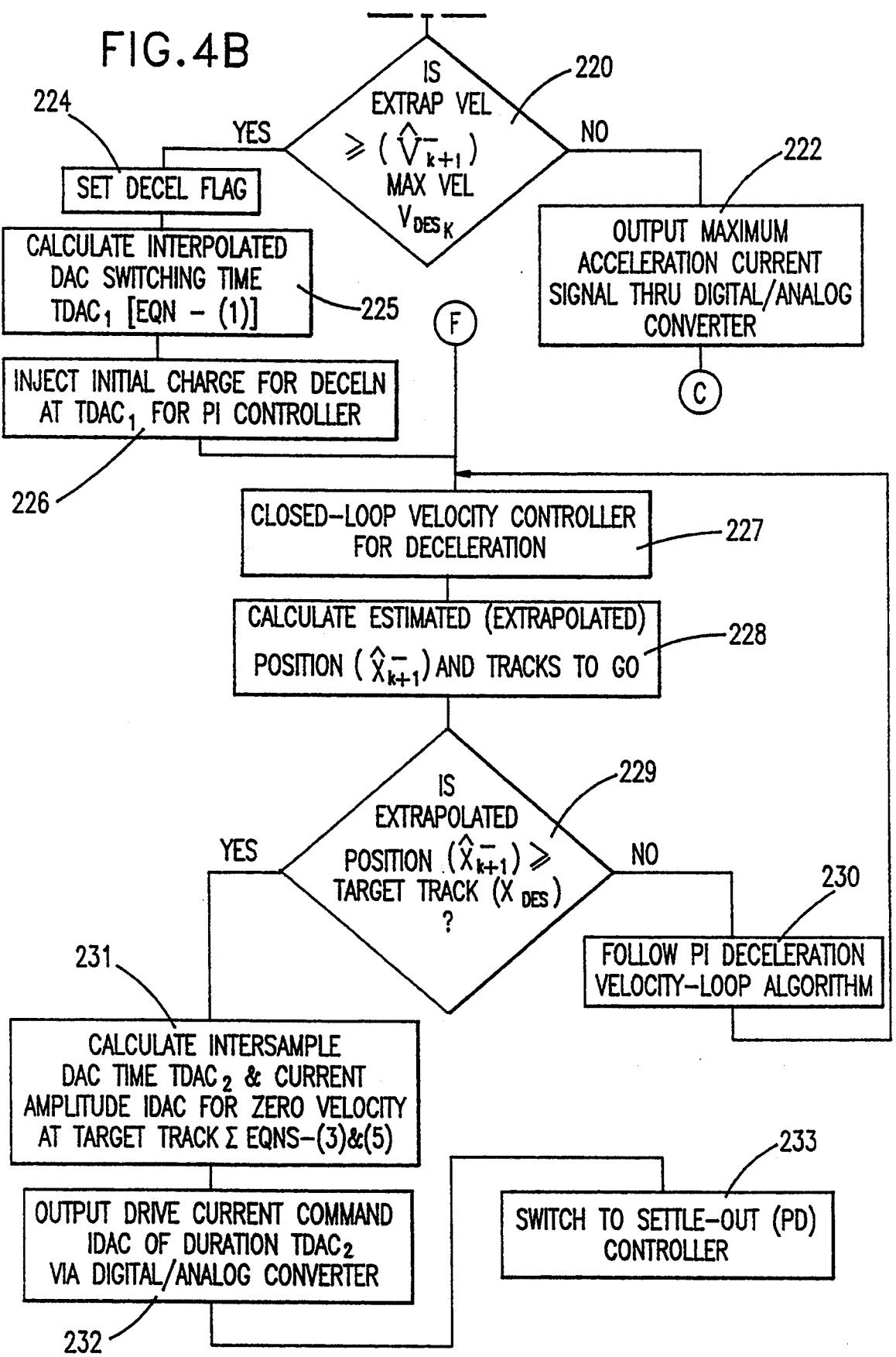

Referring to FIG. 4A and FIG. 4B, the flowchart for the operation of the servo control compensator 44 according to the invention is illustrated. Where steps in the flowchart have the same function as that in the prior art, they are indicated by a reference numeral having a value 100 higher than the corresponding step in the flowchart of the prior art (FIG. 2A and FIG. 2B) and no further description thereof is provided.

The first departure of the present invention from the manner of operation of prior art systems as described in FIG. 2A and FIG. 2B, occurs at step 220 (FIG. 4A) where an inquiry is made as to whether the extrapolated velocity $\hat{V}_{\overline{k}+1}$ at the next sampling interval will be greater than or equal to the maximum desired velocity at that sampling instant. If the answer to this inquiry is no, then branching to step 222 occurs and operation is as in the prior art. However, if the answer to the inquiry at step 220 is yes, then branching to step 224 occurs and a deceleration flag is set. At step 225 an interpolation is performed to calculate the time at which switching of the control signal being supplied-to the digital-to-analog converter should occur, so that there is no overshoot in velocity. This time is calculated by linear interpolation as set forth below.

$$T_{DAC_1} = \frac{\Delta V_k^+}{[\Delta V_k^+ + \Delta V_{\overline{k}+1}]} T_s \quad (1)$$

Figure 5A:
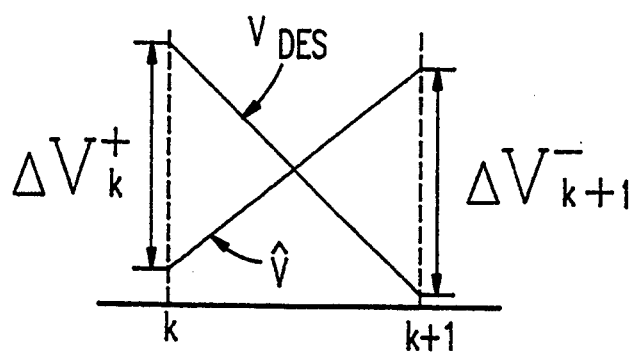
FIG. 5A is a graph illustrating the desired velocity profile and the estimated velocity between sampling time k and time k+1.
Figure 5B:
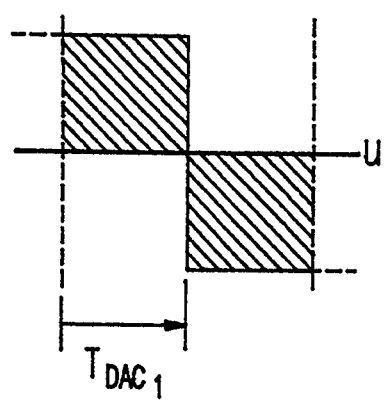
FIG. 5B illustrates the switching of the DAC output between sample times, in accordance with the invention, when the estimated velocity is equal to the desired velocity as shown in FIG. 5A.

For this equation, and for use herein, the following variables are defined:

$T_s$ = Sampling time interval
$V_{desk}$ = desired velocity at sampling time k
$\hat{V}_k$ = estimated velocity at sampling time k
$()^+$ = updated state or a variable based on that variable
$()^-$ = extrapolated state or a variable based on that variable
$\Delta V_k^+ = V_{desk} - \hat{V}_k^+$
$\Delta V_{\overline{k}+1} = \hat{V}_{\overline{k}+1} - V_{desk+1}$ FIG. 5A and FIG. 5B illustrate that, in accordance with equation 1, switching occurs at a time when the estimated velocity $\hat{V}$ is equal to the desired velocity $V_{des}$.

At step 226 an initial controller output for deceleration at time $T_{DAC_1}$ for proportional integral control is calculated by controller 156 and injected into voice coil 32 by power driver 54 (FIG. 5A and FIG. 5B). The current has a magnitude commensurate with the required deceleration. Closed loop velocity control for deceleration is commenced at step 227 (FIG. 4B), as in the prior art. At step 228 estimator 158 of servo control compensator 44 determines the extrapolated position $\hat{X}_{\overline{k}+1}$ at the next sample interval and the number of tracks which still must be traversed to reach the target track. At step 229 a determination is made as to whether or not the extrapolated position $\hat{X}_{\overline{k}+1}$ is greater than or equal to the target track. (In other words, a determination is made as to whether allowing motion to the next position will cause the head 22 to overshoot the target track.) If the answer to this inquiry is no then branching to step 230 occurs, where, as in the prior art, a proportional integral (PI) or proportional (P) deceleration velocity loop algorithm is followed and branching back to step 227 occurs. However, if the answer at step 229 is yes, then at step 231 the intersample DAC time $T_{DAC2}$ and the current amplitude $I_{DAC}$ for zero velocity at the target track are calculated by controller 156.

If:
v=Final velocity with deceleration f
u=Initial velocity=$\hat{V}_k+$
s=Tracks-to-go at instant k=$\Delta x_k$ Then the magnitude of DAC control needed following a potential sampling moment "k" is obtained by setting the terminal velocity v=0 in the basic equation:

$$v^2 = u^2 - 2fs \qquad (2)$$

which provides the coil current $I_{DAC2}$ as $$I_{DAC2} = \frac{mf}{k_F} \qquad (3)$$

where
m=mass of the VCM, and $$f = \frac{[\hat{V}_k+]^2}{2\Delta x_n} \qquad (4)$$

The duration of required deceleration is obtained using the relationship v=u−ft with the adjusted deceleration f and final velocity v=0.

$$T_{DAC2} = \frac{\hat{V}_k+}{f} = \frac{2\Delta x_n}{\hat{V}_k+} \qquad (5)$$

Figure 5C:
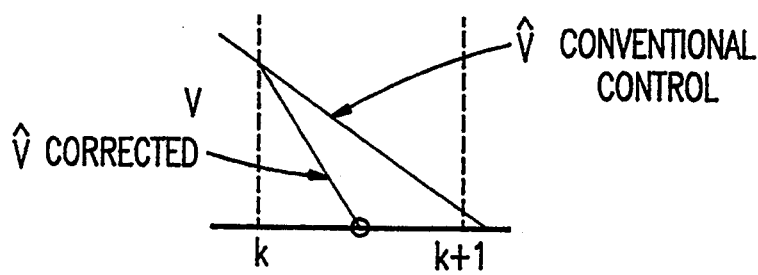
FIG. 5C illustrates the estimated velocity between sample time k and time k+1 for conventional control and for control in accordance with the invention, as illustrated in FIG. 5B.
Figure 5D:
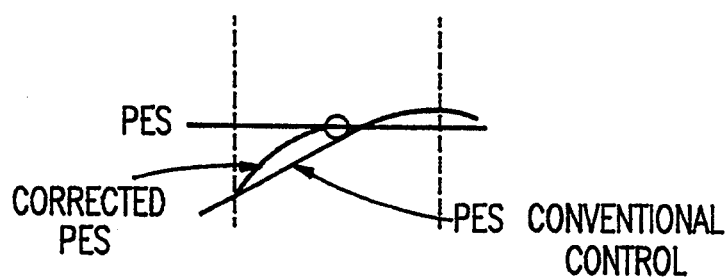
FIG. 5D illustrates the position error between sample time k and time k+1 for conventional control, and for control in accordance with the invention.
Figure 5E:
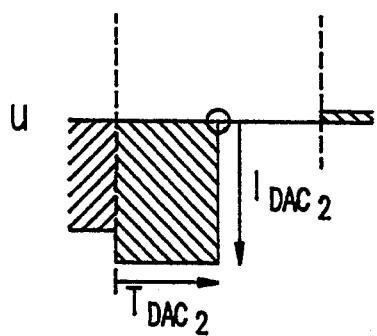
FIG. 5E illustrates switching of the control current between sample times, in accordance with the invention.

Once these computations have been performed, controller 156 causes an output drive current $I_{DAC2}$ of duration $T_{DAC2}$ to be applied to the voice coil 32 by way of power driver 54 at step 232 (FIG. 4B). As illustrated in FIG. 5C, FIG. 5D and FIG. 5E, the corrected estimated velocity $\hat{V}$, the corrected PES, and the output drive current $I_{DAC2}$, within system errors, all become zero at the same time. After this occurs, switching to the track following mode at step 233 occurs in a manner analogous to that at step 133 of the prior art.

The above computations are performed with the goal that the velocity and position error, when control is transferred from the settle-out mode to the track following mode, be as close to zero as possible. However, there may be instances when the track following controller exhibits more uniform track following characteristics for seek operations over different numbers of tracks when control is handed over with a predetermined, generally relatively small non-zero velocity or a predetermined generally relatively small, position offset from the track to be followed. If this approach is desired, then the values of s and v can be changed in the above equations to the desired values. The computed time of switching of the DAC output and the computed current will then, within system errors, provide the desired velocity and track offset at handoff to the track following controller.

A practical realization of the invention can be achieved by providing an interrupt service routine driven by a timer (set by $T_{DAC}$) in servo control compensator 44. This frees the processor from having to idle until the end of $T_{DAC}$ is reached following a sampling instant "k". The required arithmetic division in eqs. (1), (4) and (5) may be converted into a Taylor series form about appropriate nominal values so that a hardware multiplication feature provided by digital signal processor 44 may be used.

Figure 6B:
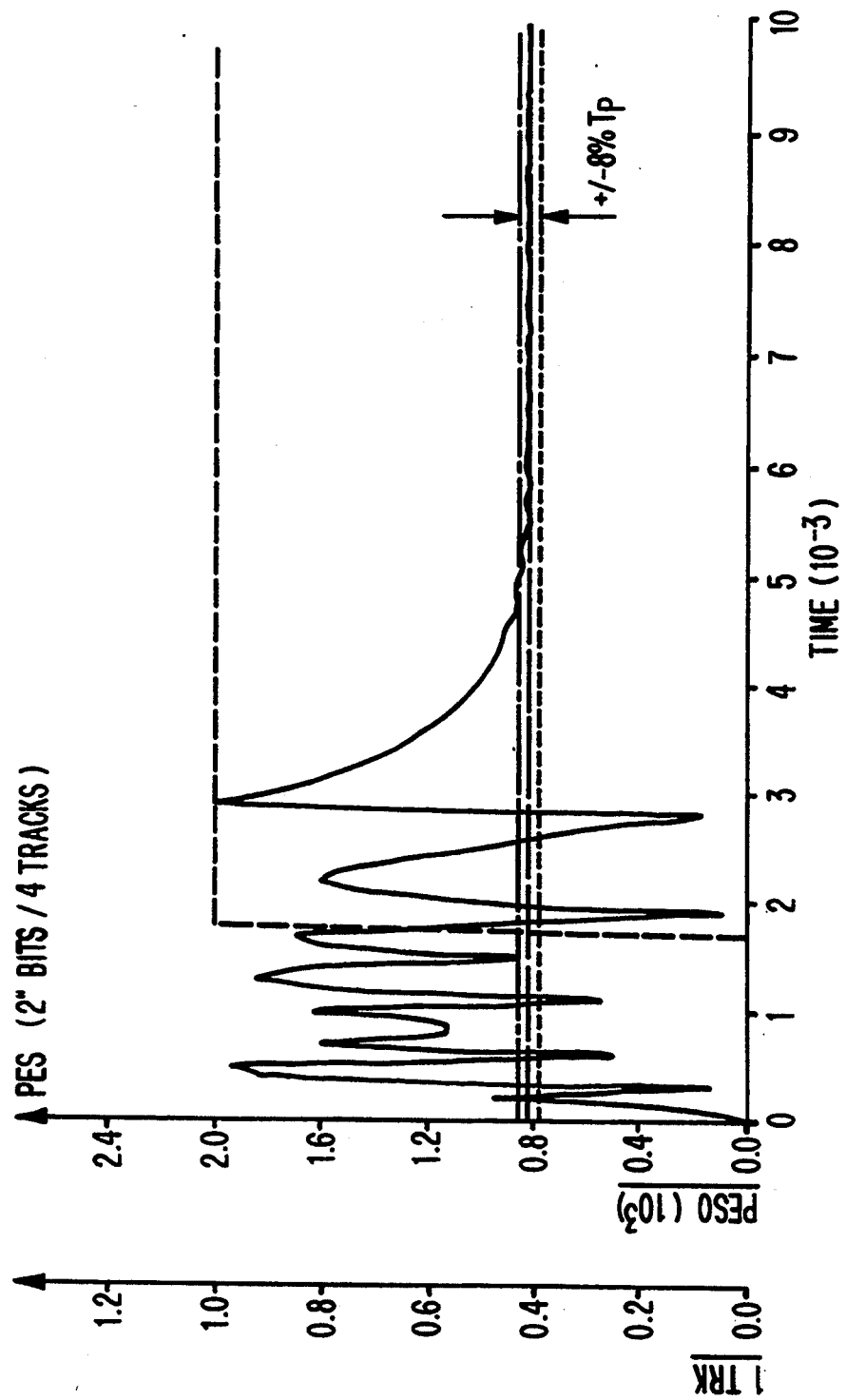

FIG. 6A and FIG. 6B show the conventional seek, settle-out, and track following phases of the velocity and position error signals during a 100 track seek of a typical 2.5 inch (6.35 cm) rotary VCM actuator of the type shown in FIG. 1 using a phase encoded servo pattern (2048 bits/4 tracks at 2500 TPI). A typical resonant mode at 2.5 kHz with a peak value of 15 dB is incorporated in the actuator model. The sampling rate is 10 kHz and the seek velocity servo uses proportional velocity error feedback, the settle-out servo uses PD control for 15 samples and the track following servo uses a PID controller. The deceleration phase is initiated when the velocity error is less than 0.002 meters/second. The switching to settle-out mode is performed when the target track is 15% of the track pitch away. In this example the move time is about 1.75 ms, the settle-out servo is on for another 1.5 ms and the total seek time for +/−8% settle-out is about 4.75 ms. At a time of approximately 1.0 msec, the velocity overshoot of $\hat{V}$ with respect to $V_{des}$ is readily apparent. This results in a large velocity error $\Delta V$ at switching to the settle-out mode.

Figure 7A:
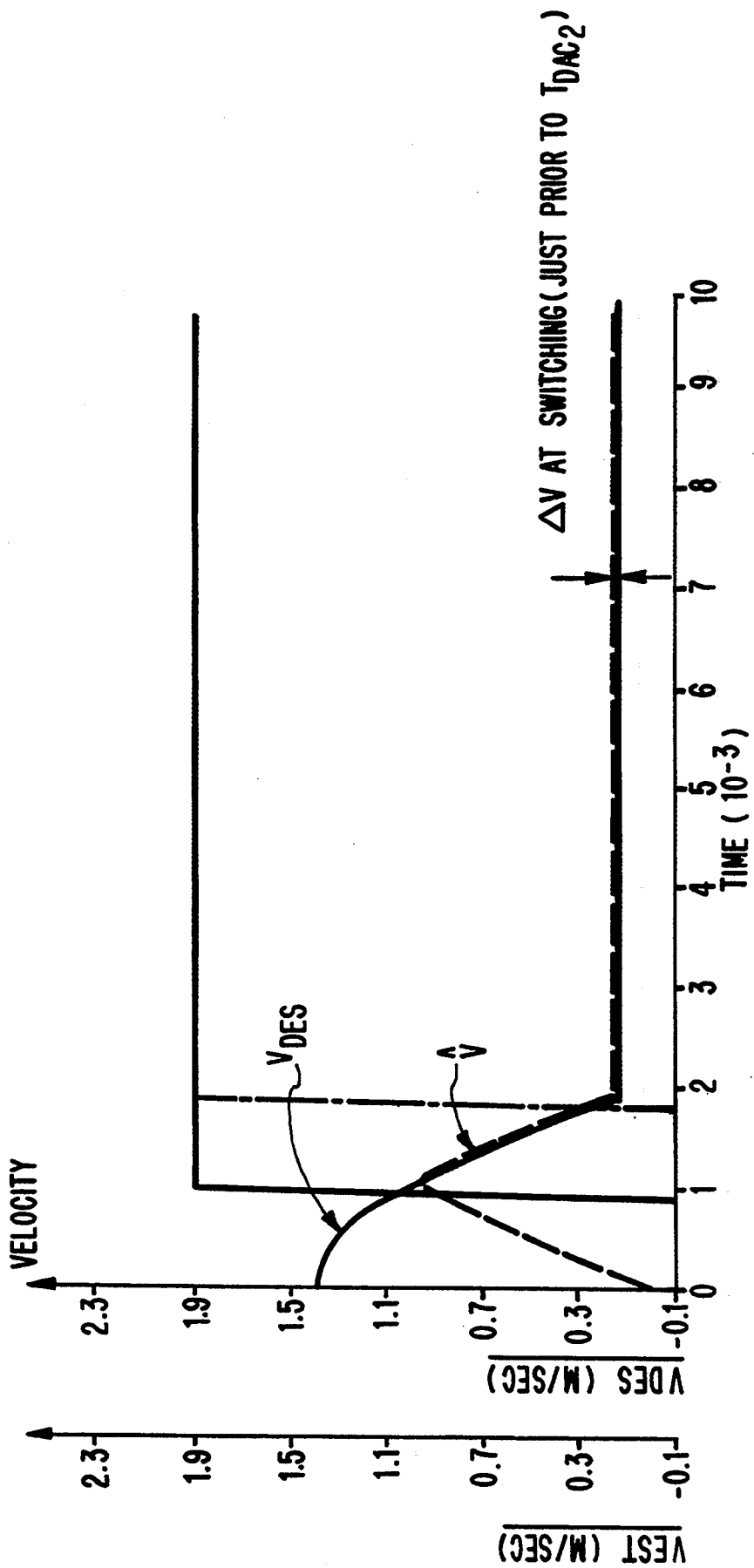
FIG. 7A and FIG. 7B illustrate, respectively, the head velocity and the position error signal of the disk drive servo which generated the the responses shown in FIG. 5A and FIG. 5B, wherein the present invention has been implemented.
Figure 7B:
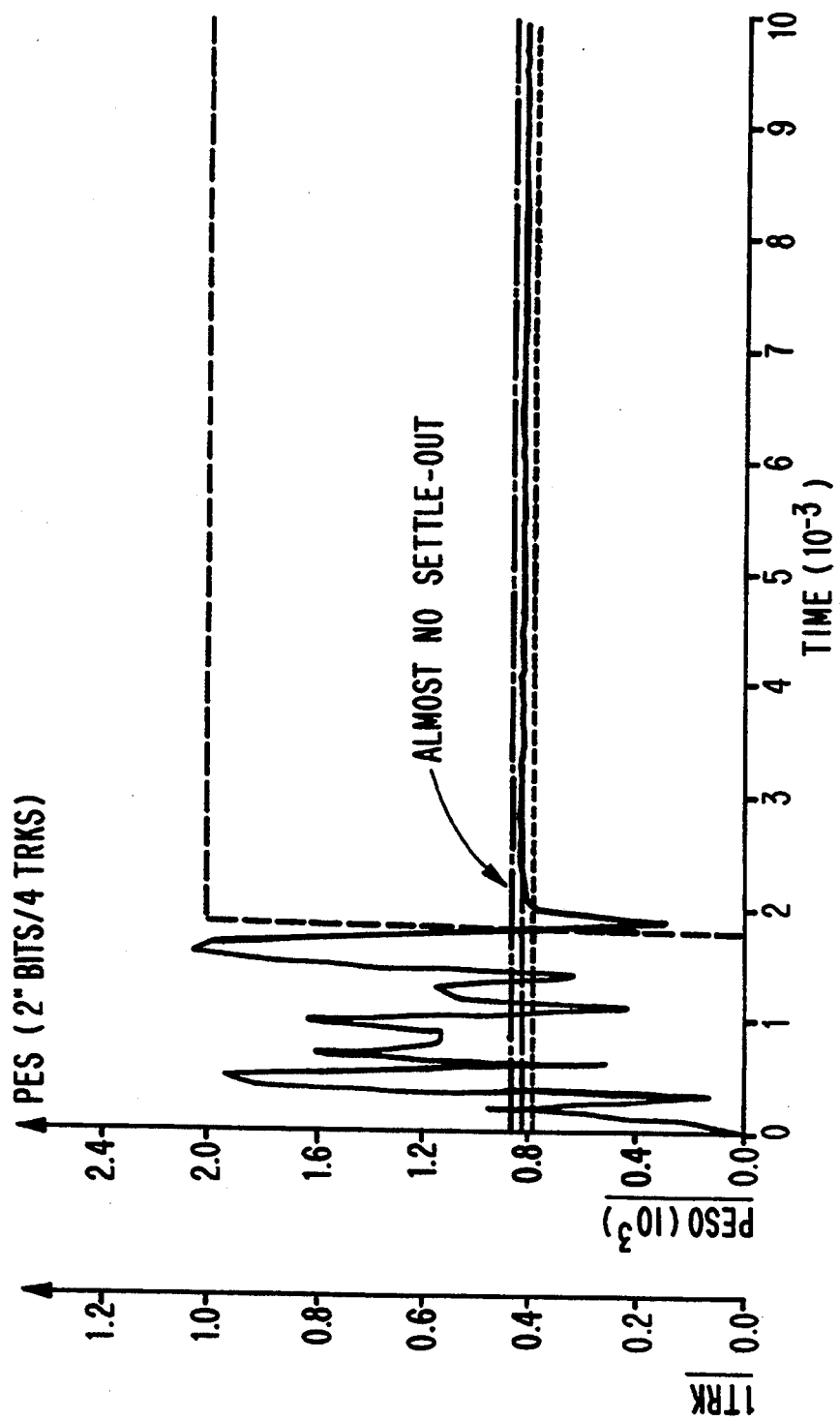

FIG. 7A and FIG. 7B show the effect of introducing intersample DAC switching for the rotary 2.5 inch actuator mentioned above. From FIG. 7A it is observable that the velocity does not overshoot with respect to the desired velocity trajectory when the deceleration phase begins, and just prior to handing over control to the track-following controller the error between the $V_{des}$ and $\hat{V}$ is almost zero. However, the estimated velocity and the position are still, not zero. If the DAC output is finely adjusted not only for pulse width, but also for current pulse amplitude, accordingly, then the settle-out controller accepts the VCM with almost zero position and velocity initial control. The total time from initiation of seek to settle-out within +/−8% 8% of the track pitch is approximately 2 ms.

Figure 8:
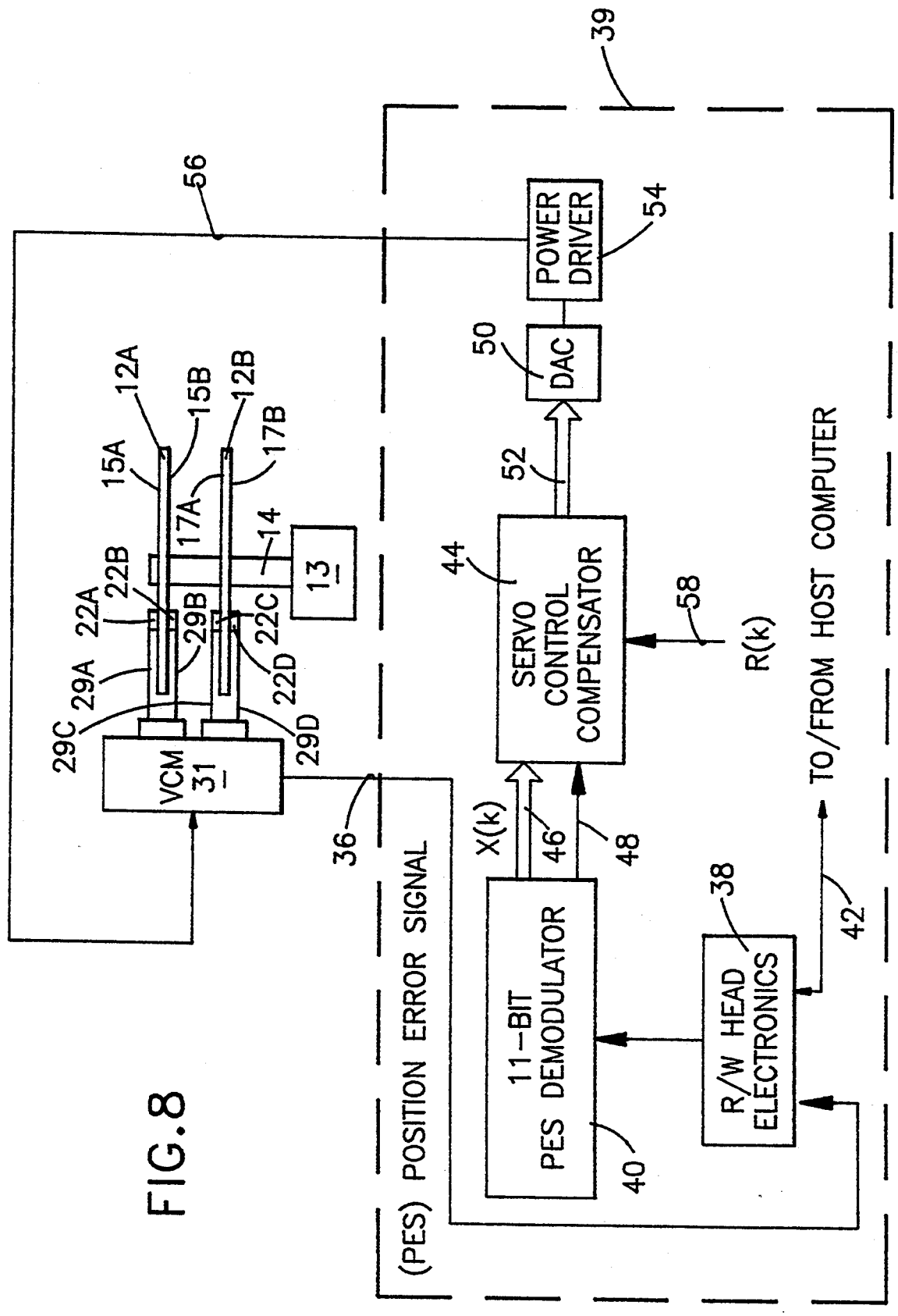
FIG. 8 illustrates a multiplatter disk drive servo in accordance with the present invention.

Referring to FIG. 8, a multi-platter direct access storage device according to the present invention is illustrated. A pair of disks 12A, 12B are supported on a spindle 14 of the disk file drive motor 13. Each of the disks 12A, 12B has two surfaces 15A, 15B and 17A, 17B respectively. For purposes of this description, surface 15A on disk 12A and surfaces 17A, 17B on disk 12B are data recording surfaces. Surface 15B on disk 12A is a dedicated servo surface and contains only prerecorded servo information. The servo information is recorded in concentric tracks and is typically written in such a manner that the intersections of adjacent servo tracks on servo surface 15B are radially aligned with the center lines of data tracks on surfaces 15A, 17A and 17B. The servo information on surface 15A may be a quadrature pattern, as is well known in the art.

The specific tracks on the data disks and the servo disk are accessed by heads 22A, 22B, 22C and 22D, each of which is associated with a respective disk surface and supported by a respective suspension 29A, 29B, 29C and 29D. The heads 22A, 22B, 22C and 22D are attached to a common accessing means or actuator, such as VCM 31. Thus the heads 22A, 22B, 22C and 22D are all maintained in a fixed relationship with one another relative to the radial position on their respective disk surfaces.

It will be apparent that the present invention may be implemented in this multi-platter arrangement. For sector servo systems the position error signal information used by the servo control system 39 (corresponding to that of FIG. 1) will correspond to the selected disk surface. In a dedicated servo approach, all information used by servo control system 39 is derived from the dedicated surface.

The intersample switching method of the present invention can be used in covering applications wherein the electrical time constants are significant. Real time computation of the maximum possible current during high velocity seek mode operations is required. Further, correction for the anticipated decay time of the current flow in the voice coil of the VCM must be made.

The present invention thus significantly enhances the performance of servo systems used to position a read/write head with respect to a storage medium. It decreases seek time by using interpolation to determine the optimum time, between the receipt of successive position error signals, to switch the current provided to the voice coil motor. It enhances settle-out performance by extrapolating the position of the head at the next receipt of the position error signal, thus assuring that overshoot of the target track does not occur.

It is also noted that the intersample switching method in accordance with the invention may be applied repetitively for several consecutive disk sectors. Finally, it may be applied in the track following mode, during periods of external vibration to render the control system more robust. In this regard, reference is made IBM Technical Disclosure Bulletin, Vol. 30, No. 6 (November, 1987).

While this invention has been described in connection with specific embodiments, it will be understood that those with skill in the art may be able to develop variations of the disclosed embodiments without departing from the spirit of the invention or the scope of the following claims:

What is claimed is:

1. A direct access storage device including a servo loop for positioning a head for interaction with a storage medium having position data recorded in selected regions thereon, comprising:

an actuator means for positioning the head so that the head periodically acquires said position data from the medium;

decoding means for decoding the position data acquired by the head from the medium and for providing decoded position data;

a driver circuit for supplying energy to said actuator means;

a controller for providing an output for controlling said driver circuit to supply said energy based on inputs representative of at least a position of said head as defined by said decoded position data received from said decoding means, and data representative of a position to which said head is to be moved; and output control means for changing magnitude of the output of said controller at times between times of receipt of position data from the medium, said output control means including:

estimating means for estimating an actual velocity of said head at a time of receipt of subsequent position data;

interpolation means for calculating an estimated time when the actual velocity of the head will match a desired velocity; and switching means for causing the magnitude of said output to change at the estimated time calculated by said interpolation means.

2. The direct access storage device of claim 1 further comprising:

computing means for computing an amount of energy needed to cause said head to have a predetermined velocity and a predetermined position with respect to the position to which said head is to be moved.

3. The direct access storage device of claim 2 wherein said predetermined velocity is substantially zero.

4. The direct access storage device of claim 2 wherein said predetermined position is the position to which said head is to be moved.

5. The direct access storage device of claim 2 wherein said predetermined velocity is a velocity other than zero.

6. The direct access storage device of claim 2 wherein said predetermined position is offset from the position to which said head is to be moved.

7. The direct access storage device of claim 2 wherein said computing means provides a first signal indicative of a value of current to be supplied by said driver circuit and a second signal indicative of a time duration over which said current is to be supplied.

8. The direct access storage device of claim 1 further comprising energy changing means for changing the energy supplied by said driver circuit at a time subsequent to said estimated time.

9. The direct access storage device of claim 1 wherein when said amount of energy is changed, it is changed from an amount which causes acceleration of said head to an amount that causes deceleration of said head.

10. The direct access storage device of claim 1 wherein said controller has a settle-out mode and said amount of energy being supplied is changed at a time just prior to said controller entering said settle-out mode.

11. The direct access storage device of claim 1 wherein said controller has a track following mode and an amount of energy being supplied is changed at a time just prior to switching to said track following mode.

12. The direct access storage device of claim 1 wherein said storage medium has a plurality of surfaces, and said position data is stored on only one of said surfaces.

13. The direct access storage device of claim 1 wherein said storage medium has a plurality of surfaces, and said position data is stored on more than one of said surfaces.

14. The direct access storage device of claim 1, in combination with a host computer, and means for operatively connecting said device to said host computer.

15. An apparatus for positioning a head for interaction with a storage medium having position data recorded in selected regions thereon, comprising:

an actuator means for positioning the head so that the head periodically acquires said position data from the medium;

decoding means for decoding the position data acquired by the head from the medium and for providing decoded position data;

a driver circuit for supplying energy to said actuator means;

a controller for providing an output for controlling said driver circuit to supply said energy based on inputs representative of at least a position of said head as defined by said decoded position data received from said decoding means, and data representative of a position to which said head is to be moved; and output control means for changing magnitude of the output of said controller at times between times of receipt of position data from the medium, said output control means including:

estimating means for estimating an actual velocity of said head at a time of receipt of subsequent position data;

interpolation means for calculating an estimated time when the actual velocity of the head will match a desired velocity; and switching means for causing the magnitude of said output to change at the estimated time calculated by said interpolation means.

16. A method for operating a direct access storage device including a servo system for controlling position of an actuator means, said actuator means having coupled thereto a head which interacts with a storage medium, said storage medium having position data stored in selected regions thereon, comprising the steps of:

determining position of the head from said position data;

acquiring information indicative of a position to which said head is to be moved by said actuator means;

supplying energy to said actuator based on a present position and the position to which said head is to be moved;

estimating an actual velocity of said head at a time of receipt of subsequent position data based on at least present position data;

interpolating to determine an estimated time at which the actual velocity of the head will equal a desired velocity; and changing said energy at said estimated time, at times between receipt of said position data by said head.

17. The method of claim 16 further comprising computing the amount of energy needed to cause said head to have a predetermined velocity and a predetermined position with respect to the position to which said head is to be moved.

18. The method of claim 17 wherein said predetermined velocity is substantially zero.

19. The method of claim 17 wherein said predetermined position is the position to which said head is to be moved.

20. The method of claim 17 wherein said predetermined velocity is a velocity other than zero.

21. The method of claim 17 wherein said predetermined position is offset from the position to which said head is to be moved.

22. The method of claim 17 wherein said step of computing the amount of energy comprises computing a current to be supplied to said actuator and a time duration over which said current is supplied.

23. The method of claim 16 further comprising again changing the amount of energy supplied to said actuator at a time subsequent to said estimated time.

24. The method of claim 16 wherein when said amount of energy is changed, it is changed from an amount which causes acceleration of said head to an amount that causes deceleration of said head.

25. The method of claim 16 wherein said amount of energy being supplied is changed at a time just prior to a settle-out mode of said controller.

26. The method of claim 16 wherein said amount of energy being supplied is changed at a time just prior to switching to a track following mode of said controller.

27. The method of claim 16 wherein said storage medium has a plurality of surfaces, and said position data is stored on only one of said surfaces.

28. The method of claim 16 wherein said storage medium has a plurality of surfaces, and said position data is stored on more than one of said surfaces.

* * * * *